M. M. Wells,
Grain Binder.
No. 77,556.        Patented May 5, 1868.
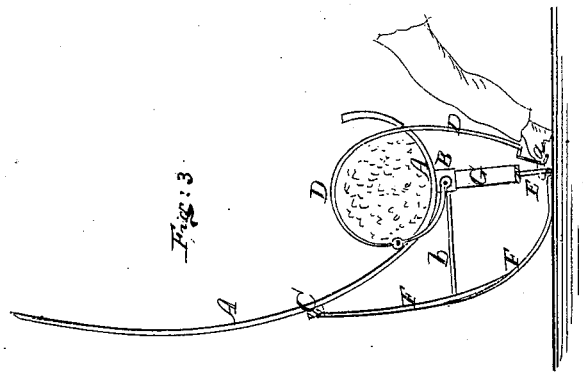
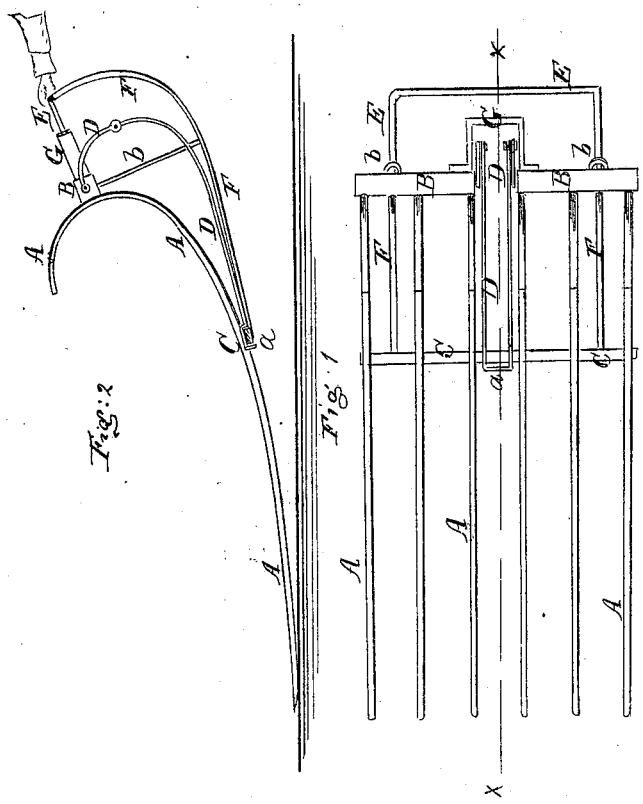
Witnesses:
Inventor:
M. M. Wells
per [signature]
Attorneys

UNITED STATES PATENT OFFICE.

MARCUS M. WELLS, OF HARTWICK, NEW YORK.

IMPROVEMENT IN GRAIN-RAKES.

Specification forming part of Letters Patent No. 77,556, dated May 5, 1868.

*To all whom it may concern:*

Be it known that I, MARCUS M. WELLS, of Hartwick, in the county of Oswego and State of New York, have invented a new and Improved Grain-Binder; and I do hereby declare that the following is a full, clear, and exact description thereof, which will enable those skilled in the art to make and use the same, reference being had to the accompanying drawings, forming part of this specification.

Figure 1 represents a plan or top view of my improved grain-binder. Fig. 2 is a longitudinal sectional view of the same, the plane of section being indicated by the line $x\,x$, Fig. 1. Fig. 3 is a similar view of the same, showing it in a different position.

Similar letters of reference indicate corresponding parts.

This invention relates to a new device for gathering the grain behind a mowing-machine or cradle, and for arranging the same so that it can easily be bound into bundles of the required size.

The invention consists in the use of a C-shaped rake-frame, which is composed of iron or other bars, connected by means of suitable cross-bars, and moved by hand or otherwise through the swath, so that the points of the bars will rest on the ground, and will rake up all the grain under which they pass, so that the required quantity of the grain will be deposited upon the frame. The rear of the frame is provided with curved rockers or with wheels, whereby the tipping of the frame is facilitated. By pressing upon the rear end of the frame the front end of the same will be elevated, so that the grain held on the frame will slide to the rear end of the same into the bent-up portion of the same. A jointed lever is pivoted to the rear cross-bar of the frame, and by its means the grain can be compressed into a bundle of the desired diameter, when it can conveniently be bound. It is then thrown off the apparatus, the front end of the latter is again lowered, and the teeth are pushed under the mowed grain to take up enough for another bundle.

A, in the drawing, represents a series of metal or other bars, which are bent into a shape similar to the letter C. These bars are arranged nearly parallel to each other, at suitable distances from each other, and are connected by means of two or more cross-bars, B C, as shown. The cross-bar B, which is arranged near the rear ends of the bars A, consists of two or more pieces, between which open spaces are left, as shown, each separate piece being connected with the other by means of a bent bar, G, as shown in Fig. 1. To the thus separated ends of the pieces B B are pivoted the ends of jointed curved levers D D, the outer ends of which are connected, as at $a$ in Fig. 1. To the bar B is secured a bent bar, E, which serves as a handle to push the apparatus forward, as indicated in Fig. 2.

Below the rear part of the frame A are secured, by means of braces $b\,b$, or otherwise, curved bars or rockers F F, or, if desired, wheels.

The operation is as follows: The apparatus is, by hand or otherwise, pushed forward on the ground, so that the ends of the bars A will be on the ground, and will, when moved under a swath of mowed grain, cause the same to be deposited upon the bars A, as is indicated in Fig. 1. When the required quantity of grain is on the frame the rear end of the same is depressed, so that the frame will turn on the rockers F, or their equivalents. The grain on the frame will thereby be caused to slide to the rear end of the frame, and the latter is held in this tipped-up position by placing the foot upon the bar E, as is shown in Fig. 3. The lever D, which, while the frame was pushed through the grain, rested with its free end upon the front cross-bar C, as in Fig. 2, is then taken and moved and bent around the grain, so that the same will be compressed into a bundle of the required size, as shown in Fig. 3. By then fastening the end of the lever to the ground and securing it there by the foot, as shown, the two hands of the operator will be free to bind the grain. As the bar B is separated between the two bars of each lever E, the operator can easily arrange the cord around the grain and bind the same.

Having thus described my invention, I claim as new and desire to secure by Letters Patent—

The jointed lever D, in combination with the curved tines A, cross-bars C B, connection G, and handle E, as described.

MARCUS M. WELLS.

Witnesses:
WM. F. MCNAMARA,
ALEX. F. ROBERTS.